Patented Mar. 4, 1952

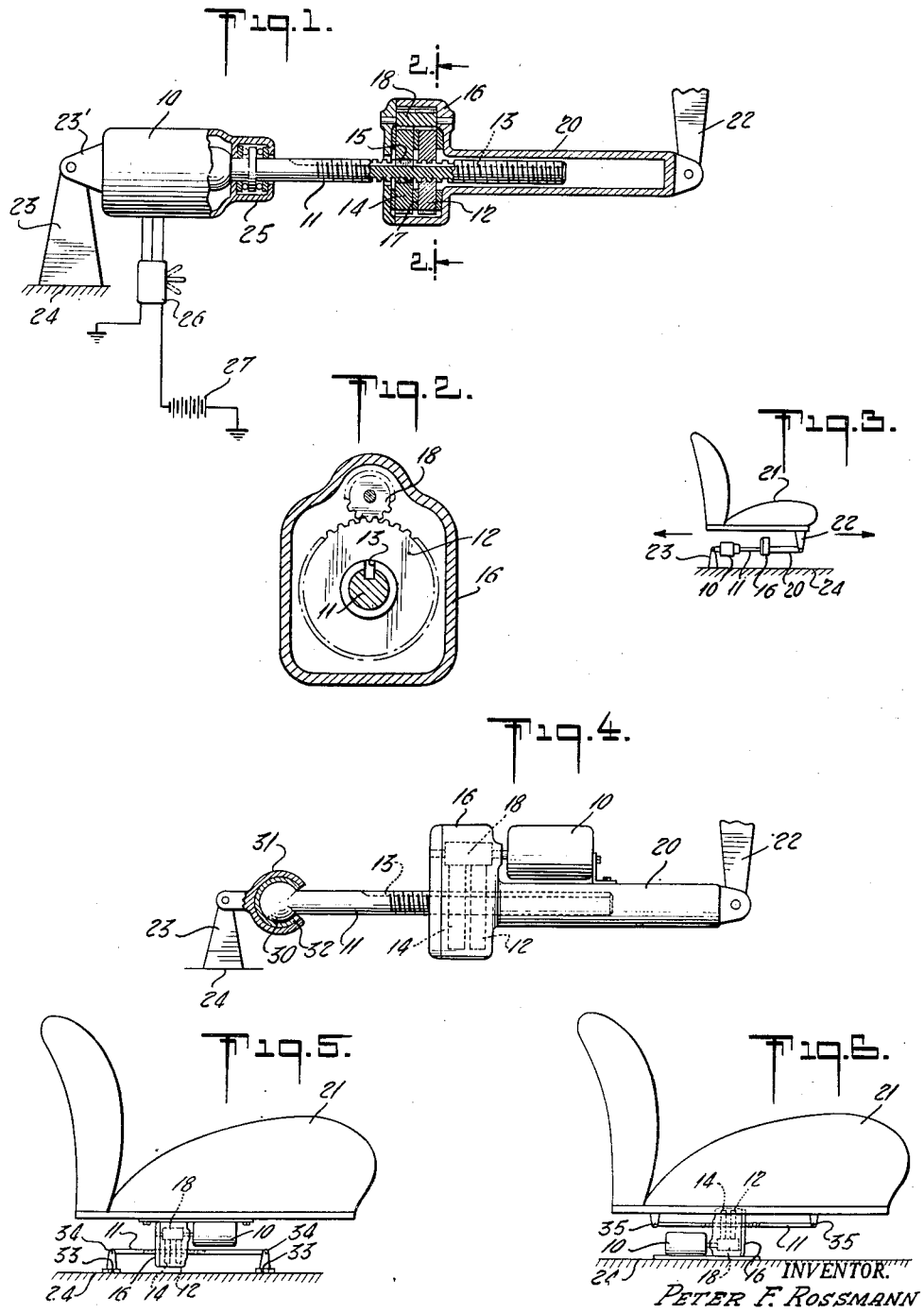

2,588,165

UNITED STATES PATENT OFFICE 2,588,165

ELECTRIC SEAT ADJUSTER AND THE LIKE

Peter F. Rossmann, Depew, N. Y., assignor, by mesne assignments, to Hupp Corporation, Cleveland, Ohio, a corporation of Virginia Application October 15, 1949, Serial No. 121,537

13 Claims. (Cl. 155—14)

1

The present invention relates to arrangements for converting rotary motion of a driving shaft into translatory motion of a driven shaft or element, more particularly though not exclusively, to mechanism for adjusting the driver's seat in a motor vehicle to suit the driver's convenience and other conditions or requirements.

A main object of the invention is the provision of a device of the above type adapted especially for operation by a high-speed electric motor and which is both simple in design as well as efficient and reliable in operation.

A more specific object of the invention is the provision of means for translating high speed rotary motion supplied by an electric motor into relatively low speed translatory motion for operating a seat slide mechanism or the like.

Another object is the attainment in devices of the above type of a substantial reduction of the speed of rotation of an input shaft to an effective output speed converted into translatory motion, while using a minimum of reducing gears and parts.

Another object is the provision of a device of the above type which is both compact in construction and cheap to manufacture and which can be easily adapted to and mounted in a motor car without requiring auxiliary devices and special operations or changes in the car's structure.

The above and further objects as well as novel aspects of the invention will become more apparent from the following detailed description taken in reference to the accompanying drawing, forming part of this specification and wherein:

Fig. 1 is an elevational view, shown partly in cross-section, of an electrical seat slide or adjusting mechanism constructed in accordance with the principles of the invention;

Fig. 2 is a cross-section on an enlarged scale, taken on line 2—2 of Fig. 1;

Fig. 3 is a schematic view illustrating the connection of the device to the driver's seat in an automobile or the like;

Fig. 4 is a schematic view similar to and showing a modification of Fig. 1;

Fig. 5 and Fig. 6 are schematic views showing further modified seat slide control devices constructed in accordance with the invention.

Like reference numerals identify like parts in the different views of drawing.

Referring to Figures 1 to 3, there is shown an electric motor 10 driving a threaded shaft 11 which fits or engages a ring-shaped internally threaded first side gear 12. Shaft 11 is also fitted

2 with a longitudinal slot or key way 13, thereby enabling it freely to move axially in and to drive a second side gear 14 through internal key 15 slidably engaging the slot 13 of shaft 11. Side gears 12 and 14 are housed in or mounted upon a casing or support 16, suitable thrust washers 17 being interposed between the gears and housing walls. Gears 12 and 14 having different numbers of teeth both mesh with an idler gear or differential pinion 18 rotatably supported by or mounted in casing 16. If desirable, additional idler or differential pinions supported by casing 16 and meshing with the side gears 12 and 14 may be provided.

According to a preferred embodiment, the gears 12 and 14, though of different number of teeth, are made to have the same pitch diameter by an expanded pitch diameter cutting method. The latter is based on the well known fact, especially in case of standard involute gearing, that uniform angular motion may be transmitted between two gears, even though the center distance be changed slightly. Thus, the teeth of either of the gears 12 or 14 may be cut somewhat deeper, using the same pitch diameter, so as to result in a single tooth differential between the gears. Alternatively, the gears may be cut with different pitch diameters for a slightly displaced center distance to obtain the same effect. In both cases, despite the slight difference of the center distance, the correctness of action of meshing of the gears is maintained. Alternatively, the pinion 18 may be made with two sections or parts of different diameter each meshing with one of the side gears 12 and 14 which also are of different pitch diameter and different number of teeth.

The housing 16 is connected through a hollow cylindrical extension 20 to the forward end of the seat 21 (Fig. 3) through a pivoted link 22 or any other suitable manner. Seat 21 is mounted or arranged to move or slide in a direction parallel to the axis of shaft 11 or extension 20, as indicated by the arrows in the drawing, by the provision of suitable guide means (not shown), as will be readily understood.

The motor 10 is connected through extension 23' and bracket 23 to a stationary element such as the floor 24 of a motor car or other support. The pivotal connection between link 23' and bracket 23 serves to compensate for slight misalignment of the seat and associated adjusting members to insure smooth and reliable operation. The motor is advantageously provided with a thrust bearing 25 to take up the axial load of shaft 11. Item 26 represents a reversible electric switch connected between a suitable power source, such as the car battery 27 in case of an automobile seat adjuster, and the direct and reverse winding of the motor 10. Switch 26 is preferably of the self-centering or toggle type, whereby to allow starting and operation of the motor in either direction by control of a switch lever between two positions, as indicated in dotted lines in the drawing. The motor may be of the type having separate direct and reverse windings as assumed in the drawing, or a motor with a single control winding may be used in connection with a polarity reversing control switch, as will be readily understood by those skilled in the art.

In operation, shaft 11 through key 15 rotates gear 14 which through pinion 18 drives internally threaded gear 12 in the same direction. Assuming that both gears 12 and 14 are of the same diameter and equal number of teeth, both the shaft 11 acting as a lead screw and gear 12 forming a traveling nut will rotate at the same speed or, in other words, no relative rotation will exist between the shaft 11 and gear 12. As a result, no translatory motion of casing 18 and in turn of seat 21 is obtained. Since, however, gears 12 and 14 are constructed with different number of teeth, a relative rotation will result between the gear 12 and the shaft 11, depending upon the difference in the number of teeth, which relative rotation through differential or idler pinion 18 will be transferred into rectilinear motion of casing 18 and in turn the seat 21.

As an example, let it be assumed that gear 14 has $k=19$ teeth and that gear 12 has $t=20$ teeth and assuming further that the lead or pitch of the thread of shaft 11 is $l=.0625''$, that the single differential pinion 18 has $p=10$ teeth and that the motor rotates at $w=3000$ R. P. M. In this case, gear 12 will rotate at a speed $$w' = \frac{wk.p}{p.t} = 3000 \cdot \frac{19.10}{10.20} = 2850 \text{ R. P. M.}$$

The difference $w-w'=150$ R. P. M. represents the relative speed or rotation between gears 12 and 14 and constitutes the effective speed determining the displacement of the seat 21. Accordingly, the total displacement during one minute or 3000 revolutions of the motor will be $150 \times .0625'' = 9.4000''$.

In case of using a pinion having two sections of different diameters and numbers of teeth, such as $p_1=10$ teeth meshing with gear 14 and $p_2=9$ teeth meshing with gear 12, the relative speed $w-w'$ between gears 12 and 14 will be:

$$w-w' = 3000 - 3000 \cdot \frac{19.9}{10.20} = 450 \text{ R. P. M.}$$

From this it is seen that the maximum speed reduction is obtained when using a pair of side gears of equal pitch diameter differing by a single tooth and meshing with a single pinion, as in the case of the first example described above.

Referring to Fig. 4, there is shown a modification of Fig. 1, wherein the motor 10 is supported by the extension 20 of the housing or support 16 and drives the differential pinion 18, while the shaft 11 has a spherical-shaped free end 30 supported by a socket 31 to form a ball joint bearing. The latter is advantageously provided with an oilite-type or other self-lubricating lining 32. The remaining parts and the operation of this device are substantially similar to and readily understood from the description of the preceding figures.

Fig. 5 schematically illustrates a modification of the construction according to Fig. 4, wherein both the motor 10 and the casing or support 16 housing the differential gearing 12, 14, 18 are attached or secured to the seat 21 and the threaded and keyed shaft 11 is supported at both ends by suitable ball joint bearings 34 mounted upon the car floor 24, preferably through rubber or equivalent resilient mountings 33 adapted to take up vibration and shocks and to insure a smooth and reliable control of the seat 21.

Fig. 6 shows another modification differing from Fig. 5 by the mounting of the motor 10 and differential gear casing upon the floor 24 and mounting the shaft 11 upon the underside of the seat 21 by means of ball joints 35, in substantially the same manner and readily understood from the foregoing.

Arrangements according to Figures 4 to 6, aside from increased facility of mounting the motor and differential gearing upon the seat 21 or floor 24, respectively, have the further advantage of providing additional speed reduction between the motor driving shaft and the driven or output members. This in turn results in a corresponding torque multiplication which will allow of the use of a motor of greater initial speed and efficiency to produce a desired translatory motion or operating stroke of the seat or other driven member for a given set of operating conditions and requirements.

While there have been shown and described a few desirable embodiments of the invention, suitable especially or adapted for a seat slide or adjuster for motor vehicles, it will be evident from the foregoing that the structures shown and disclosed have numerous other uses and applications involving the conversion of relatively high speed rotary motion into relatively low speed translatory motion, and that changes in the size, shape and arrangement of the parts as well as the substitution of equivalent parts or elements for those shown herein, may be made in accordance with the broader scope and spirit of the invention as defined in the appended claims. The specification and drawings are accordingly to be regarded in an illustrative rather than in a limiting sense.

I claim:

1. Means for transforming relatively high speed rotary motion into relatively low speed translatory motion comprising a threaded shaft having a longitudinal slot, a first ring-shaped internally threaded side gear engaged by said shaft, a second ring-shaped side gear having a number of teeth different from said first side gear and provided with a key slidably engaging said slot, a driven member arranged for translatory movement parallel to said shaft, and differential gear means rotatably supported by said member and meshing with both said side gears.

2. Means for transforming relatively high speed rotary motion into relatively low speed translatory motion comprising a rotatably mounted threaded shaft having a longitudinal slot, a first ring-shaped internally threaded side gear forming a traveling nut engaged by said shaft, a second ring-shaped side gear provided with a key slidably engaging said slot, said second side gear having substantially the same pitch diameter as said first side gear and differing from said first side gear by a single tooth, a driven member arranged to move in a direction parallel to said shaft, and at least one differential gear rotatably supported by said driven member and meshing with both said side gears.

3. Means for transforming relatively high speed rotary motion into relatively low speed translatory motion comprising a rotatably mounted threaded driving shaft having a longitudinal slot, a first ring-shaped internally threaded side gear forming a traveling nut engaged by said shaft, a second ring-shaped side gear having a key slidably engaging said slot, said second side gear having a number of teeth greater than said first side gear, a driven member arranged to move in a direction parallel to said shaft, and idler gear means rotatably supported by said member and meshing with both said side gears.

4. Means for transforming relatively high speed rotary motion into relatively low speed translatory motion comprising a rotatably mounted threaded driving shaft having a longitudinal slot, a first ring-shaped internally threaded side gear forming a traveling nut engaged by said shaft, a second ring-shaped side gear having a key slidably engaging said slot, said second side gear having substantially the same pitch diameter as and differing from said first side gear by a single tooth, a driven member arranged to move in a direction parallel to said shaft, and at least one idler gear rotatably supported by said member and meshing with both said side gears.

5. In an electric seat slide mechanism, the combination which comprises a threaded driving shaft adapted for rotation by an electric motor in either direction, said shaft having a longitudinal slot and being arranged with its axis parallel to the movement of said seat, a first ring-shaped internally threaded side gear engaged by said shaft, a second ring-shaped side gear having a number of teeth different from said first side gear and being provided with a key engaging slidably said slot, and idler gear means rotatably supported by said seat and meshing with both said side gears.

6. In an electric seat slide mechanism, the combination which comprises a threaded driving shaft adapted for rotation by an electric motor in either direction, said shaft having a longitudinal slot and being arranged with its axis parallel to the movement of said seat, a first ring-shaped internally threaded side gear engaged by said shaft, a second ring-shaped side gear of equal pitch diameter to and differing from said first side gear by a single tooth, said second side gear having a key slidably engaging said slot, and at least one idler gear rotatably supported by said seat and meshing with both said side gears.

7. In an electric seat slide mechanism, the combination which comprises a threaded driving shaft having one end connectable to an electric motor for rotating the same in either direction, said shaft having a longitudinal slot and being arranged with its axis parallel to the movement of said seat, a first ring-shaped internally threaded side gear engaged by said shaft, a second ring-shaped side gear having a number of teeth different from said first side gear and provided with a key slidably engaging said slot, a support having a hollow cylindrical extension connectable to said seat and encircling the free portion of said shaft, and driving gear means rotatably mounted upon said support and meshing with both said side gears.

8. In an electric seat slide mechanism, the combination which comprises a stationary threaded shaft rotatably mounted at both ends, said shaft having a longitudinal slot and being arranged with its axis parallel to the sliding movement of said seat, a first ring-shaped and internally threaded side gear engaged by said shaft, a second ring-shaped side gear having a number of teeth different from said first side gear and provided with a key slidably engaging said slot, and input driving gear means rotatably supported by said seat and meshing with both said side gears.

9. In an arrangement as claimed in the preceding claim, wherein said first and second side gears are of substantially the same pitch diameter and differ from each other by a single tooth and wherein said driving gear means is comprised of a single gear meshing with both said side gears.

10. In an electric seat slide mechanism, the combination which comprises a threaded shaft having a longitudinal slot and rotatably mounted upon said seat with its axis parallel to the sliding motion of said seat, a first ring-shaped and internally threaded side gear engaged by said shaft, a second ring-shaped side gear having a number of teeth different from said first side gear and being provided with a key slidably engaging said slot, and stationarily mounted driving input gear means meshing with both said side gears and adapted for rotation by an electric motor in either direction.

11. In an arrangement as claimed in the preceding claim wherein said first and second side gears are of substantially the same pitch diameter and differ from each other by a single tooth and wherein said driving gear means is comprised of a single stationary mounted gear meshing with both said side gears.

12. The combination with a first member slidable relative to a second member, of a threaded shaft provided with a longitudinal slot and being rotatably supported by one of said members, a first ring-shaped internally threaded side gear engaged by said shaft, a second ring-shaped side gear having a number of teeth different from said first side gear and provided with a key slidably engaging said slot, and differential gear means rotatably supported by the other of said members and meshing with both said side gears.

13. In an arrangement as claimed in the preceding claim wherein said first and second side gears are of substantially the same pitch diameter and differ from each other by a single tooth and wherein said differential gear means is comprised of a single gear meshing with both said side gears.

PETER F. ROSSMANN.

REFERENCES CITED

The following references are of record in the file of this patent:

UNITED STATES PATENTS

| Number | Name | Date |
|---|---|---|
| 271,295 | Anderson | Jan. 30, 1883 |
| 2,266,010 | De Veau | Dec. 16, 1941 |
| 2,432,895 | Horton | Dec. 16, 1947 |

FOREIGN PATENTS

| Number | Country | Date |
|---|---|---|
| 414,290 | Germany | June 9, 1925 |